United States Patent [19]

Berkowitz

[11] Patent Number: 4,695,596

[45] Date of Patent: Sep. 22, 1987

[54] STABLE, LOW VISCOSITY POLYMER/POLYISOCYANATE DISPERSION

[75] Inventor: Phillip T. Berkowitz, Woodbridge, Conn.

[73] Assignee: Olin Corporation, Cheshire, Conn.

[21] Appl. No.: 901,505

[22] Filed: Aug. 28, 1986

[51] Int. Cl.$^4$ ............................................. C08G 18/14
[52] U.S. Cl. .................................... 521/137; 524/197; 524/728; 525/123; 525/130; 525/131
[58] Field of Search ................ 521/137; 524/197, 728; 525/123, 130, 131

[56] References Cited

U.S. PATENT DOCUMENTS

| | | | |
|---|---|---|---|
| 3,422,165 | 1/1969 | Brotherton et al. | 260/859 |
| 3,654,196 | 4/1972 | Wagner et al. | 204/159.23 |
| 3,968,089 | 7/1976 | Cuscurida et al. | 260/859 R |
| 4,122,049 | 10/1978 | Wagner | 521/136 |
| 4,283,500 | 8/1981 | Armstrong et al. | 521/137 |
| 4,332,716 | 7/1982 | Shah | 521/137 |

FOREIGN PATENT DOCUMENTS 1447273 8/1976 United Kingdom .
1447274 8/1976 United Kingdom .

Primary Examiner—Maurice J. Welsh
Attorney, Agent, or Firm—Dale L. Carlson; Thomas P. O'Day

[57] ABSTRACT

A stable, low viscosity polymer/polyisocyanate dispersion wherein the polymer is produced by polymerizing an ethylenically unsaturated macromolecular monomer with another ethylenically unsaturated monomer, together with a polyurethane foam, elastomer, adhesive, sealant, or coating produced therefrom and a method for fabricating the foam.

24 Claims, No Drawings

STABLE, LOW VISCOSITY POLYMER/POLYISOCYANATE DISPERSION

FIELD OF THE INVENTION

The present invention relates generally to polymer/polyisocyanate dispersions and, more specifically, to such dispersions characterized by stability and low viscosity.

BACKGROUND OF THE INVENTION

In the production of polyurethane foams, elastomers, and coatings, a polyol is reacted with a polyisocyanate in the presence of a urethane catalyst. It is well established in the art that physical properties of these foams, elastomers, adhesives, sealants, and coatings can be enhanced by incorporating solids as an organic filler into the polyol side of a polyurethane formulation (i.e., the so-called "B-side") in the form of dispersed polymer particles prior to the urethane-forming reaction. More specifically, it is known that high levels of dispersed polymer are desired since the firmness of the resulting foams and elastomers, generally expressed as load-bearing capacity or modulus, is thereby enhanced. By way of illustration, U.S. Pat. No. 4,454,255 discloses a method of preparing high non-urethane polymer content dispersions in polyols of greater than 30 percent, based on the total polymer plus polyol, employing polyols containing low levels of induced unsaturation to provide polymer/polyols disclosed as having acceptable viscosity.

The incorporation of polymers into the polyisocyanate side (i.e., the so-called "A-side") of a polyurethane formulation is also known. For example, U.S. Pat. No. 4,332,716 discloses a polymer/polyisocyanate dispersion comprising (a) a major amount of a first organic polyisocyanate, (b) a minor amount of a first polymer of at least one ethylenically unsaturated monomer dispersed in said polyisocyanate, and (c) a minor amount of a stabilizer selected from the group consisting of (1) polyoxyalkylene polyols having a number average molecular weight of at least 4000 and (2) isocyanato-terminated prepolymer formed by reacting said polyol with a second polyisocyanate. The '716 patent discloses that the polymer/polyisocyanates of that patent have acceptable viscosities in contradistinction to the prior art discussed in that patent.

Another disclosure of polymer/polyisocyanate dispersions having acceptable viscosity is found in U.S. Pat. No. 4,283,500. The '500 patent discloses polymer/polyisocyanates wherein the polymer is formed in situ in the polyisocyanate by the polymerization of acrylonitrile, alone or together with one or more ethylenically unsaturated monomers, wherein the polyisocyanate comprises at least 20 percent of methylene-bis(4-phenyl isocyanate) (also referred to herein as "MDI") or a polymeric polyisocyanate(s). At column 30, lines 61 through 66 of the '500 patent, it is disclosed that in "Examples F and G in which the polyisocyanate used was composed of large amounts of or all TDI (toluene diisocyanate), the particle sizes of the resulting polymers were relatively large and agglomeration occurred to the extent that the dispersion stability was not considered to be adequate." Such a result is highly undesirable in view of the fact that TDI is the polyisocyanate of choice, particularly when fabricating flexible polyurethanes.

In view of the increasing need in the industry for a higher and higher organic filler solids content in polyurethane foams, elastomers, adhesives, sealants, and coatings, it would be highly desirable to provide a polymer/polyisocyanate dispersion characterized by advantageous viscosity, even when containing a high non-urethane polymer loading, and also characterized by storage stability against phase separation, particularly in commercially significant polyisocyanates such as toluene diisocyanate. Heretofore, the preparation of such polymer/polyisocyanates using polymers fabricated from macromolecular monomers has not been known or suggested based on the knowledge of the present invention.

SUMMARY OF THE INVENTION

In one aspect, the present invention relates to a stable polymer/polyisocyanate dispersion comprising:
(a) a polyisocyanate and
(b) a polymer which is a reaction product of an ethylenically unsaturated macromolecular monomer and at least one other ethylenically unsaturated monomer.

In another aspect, the present invention relates to a method for producing a stable polymer/polyisocyanate dispersion comprising an in situ polymerization product of an ethylenically unsaturated macromolecular monomer and at least one other ethylenically unsaturated monomer in the presence of a polymerization catalyst, said in situ polymerization being carried out in a polyisocyanate.

In yet another aspect, the present invention relates to a method for producing a stable polymer/polyisocyanate dispersion comprising the steps of:
(a) polymerizing an ethylenically unsaturated macromolecular monomer with at least one other ethylenically unsaturated monomer to produce a polymer, and
(b) mixing said polymer with at least one polyisocyanate to produce said dispersion.

In still another aspect, the present invention relates to a polyurethane foam fabricated by reacting a polymer/polyisocyanate dispersion with a polyol in the presence of a blowing agent and a polyurethane reaction catalyst, wherein said polymer/polyisocyanate dispersion comprises a polymer in a polyisocyanate, and wherein said polymer is a reaction product of an ethylenically unsaturated macromolecular monomer and at least one other ethylenically unsaturated monomer.

Also, in still another aspect, the present invention relates to polyurethane foams, elastomers, adhesives, sealants, and coatings fabricated by reacting a polymer/polyisocyanate dispersion with a poly(active hydrogen) compound in the presence of a polyurethane reaction catalyst, wherein said polymer/polyisocyanate dispersion comprises a polymer in a polyisocyanate, and wherein said polymer is a reaction product of an ethylenically unsaturated ethylenically unsaturated monomer.

DETAILED DESCRIPTION OF THE INVENTION

In accordance with the present invention, polymer/polyisocyanate dispersions prepared by reacting an ethylenically unsaturated macromolecular monomer with at least one other ethylenically unsaturated monomer, have been unexpectedly found to provide a combination of excellent storage stability and low viscosity, even at high polymer solids levels in the dispersions.

These polymer/polyisocyanate dispersions lend themselves to the use of TDI as the polyisocyanate in the dispersion. The physical properties of these polymer dispersions, particularly their advantageous viscosity, make them particularly suitable for use in the fabrication of polyurethane foams, elastomers, adhesives, sealants, and coatings having high levels of polymer solids functioning as an organic filler in the fabricated product. Furthermore, the use of high polymer solids polymer/polyisocyanate dispersions (e.g., 40 weight percent or higher polymer solids based on the total weight of the dispersion) together with a high polymer solids polymer/polyol (e.g., 40 weight percent or higher polymer solids content based upon the total weight of the polymer/polyol) makes possible the fabrication of higher polymer solids content polyurethane foams, elastomers, adhesives, sealants, and coatings, (e.g., 40 weight percent or higher) than were heretofore possible based upon the knowledge of L the present inventor. Moreover, the polyurethane foams having these high polymer solids contents of 40 weight percent or higher provide an advantageous ratio of $\Delta$ compression strength at 25 percent compression to $\Delta$ density of at least about 0.2, as more fully described in EXAMPLE 1 below. In addition, the use of the polymer/polyisocyanate dispersions of the present invention permits wide latitude in the choice of the polyol to make the polyurethane products. In contrast, the polymer/polyol dispersions of the prior art are tailored to specific polyols.

As used herein, the term "dispersion" is intended to encompass both conventional dispersions and microdispersions, i.e., solid polymer particles of submicron size, as well as those above one micron in size, in the liquid polyisocyanate.

As used herein, the term "stable" used in connection with the dispersions of the present invention denotes physical stability of the dispersion against phase separation. The term "stable dispersion" denotes such physical stability for at least a three month time period, preferably a six month time period, at ambient temperature.

The macromolecular monomers useful in the preparation of the dispersions of the present invention can be generally characterized as having a solubility of at least 0.5 weight percent in the polyisocyanate, based upon the total weight of macromolecular monomer plus polyisocyanate in the dispersion. In addition these macromolecular monomers have at least one ethylenically unsaturated group suitable for copolymerization, preferably a terminal ethylenically unsaturated group. A representative example is described in detail in U.S. Pat. No. 3,786,116, incorporated herein by reference.

While the above macromolecular monomers can be prepared by reacting an anionically polymerized living polymer with a polymerizable moiety, other synthetic schemes could be employed. The preferred macromolecular monomers are represented by the empirical formula:

A—X wherein A is an oligomer soluble in said polyisocyanate and X is an ethylenically unsaturated group. The particularly preferred macromolecular monomers are vinyl-terminated polystyrene compounds having a number average molecular weight within the range of between about 500 and about 100,000, and more preferably, those having a number average molecular weight between about 4000 and about 14,000. A particularly useful macromolecular monomer is CHEMLINK 4500 (a product of the Sartomer Company), which is a polystyrene oligomer with a terminal methacrylate group, wherein the oligomer has a molecular weight of about 13,000.

The macromolecular monomer, can be mixed with the "other monomer(s)", polyisocyanate, and polymerization catalyst and polymerized in situ in the polyisocyanate, to provide the polymer/polyisocyanate dispersion. Alternatively, the polymerization can be carried out in a solvent such as cyclohexane, benzene, toluene, or xylene, and the resulting polymer added to and dispersed in the polyisocyanate. In another embodiment, the polymerization can be effected in a mixture of a solvent and a polyisocyanate.

In the preparation of the polymer dispersion, the ethylenically unsaturated macromolecular monomer is employed in an amount sufficient to stabilize the dispersion of resulting polymer in the polyisocyanate. Preferably, the macromolecular monomer is employed in an amount of between about 0.25 and about 20, more preferably between about 5 and about 10, weight percent based upon the total weight of macromolecular monomer plus other ethylenically unsaturated monomers in the dispersion. When operating below the lower limit of 0.25 weight percent of macromolecular monomer, the stability of the dispersion may be compromised, whereas above the upper limit of 20 weight percent, further enhancement of dispersion stabilization above that provided at the upper limit is not expected and viscosity of the dispersion will tend to increase, thereby making processing more difficult.

Although not wishing to be bound by any particular theory, it is believed by the present inventor that stabilization of the dispersions in the polyisocyanate of the present invention is effected by virtue of the amphipathic character of the resulting co-polymer of macromolecular monomer and ethylenically unsaturated monomer(s). For example, it is theorized that one portion (e.g., a vinyl moiety) of the macromolecular monomer is chemically bonded to the polymer particle surface while another portion (e.g., polystyryl moiety) reaches out into the surrounding polyisocyanate phase, thereby providing a protective shield against coagulation of the individual polymer particles. It is thus theorized that the co-polymer that is thereby formed has polystyryl "tails" that are solvated in the polyisocyanate, with these "tails" providing stabilization of the polymer against coagulation of the polymer particles.

Suitable ethylenically unsaturated monomers (so-called "other monomers" or "other ethylenically unsaturated monomers" as used herein) which are polymerized in the presence of the aforementioned macromolecular monomer include aliphatic conjugated dienes such as butadiene and isoprene; monovinylidene aromatic monomers such as styrene, α-methyl styrene, α-ethyl styrene, α-(t-butyl)styrene, α-chlorostyrene α-cyanostyrene and α-bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)-acrylamide, and the like; vinyl esters such as vinyl acetate; vinyl ethers; vinyl ketones; vinyl and vinylidene halides as well as a wide variety of other ethylenically unsaturated materials which are copolymerizable with the aforementioned mono-adduct, many of which have heretofore been employed in the formation of copolymer polyols as described in U.S. Pat. Nos. 3,823,201 and 3,383,351. It is understood that mixtures of two or more of the aforementioned "other monomers" are also suitably employed in making the copolymer. Of the foregoing "other monomers", vinylidene chloride, acrylonitrile, and mixtures of acrylonitrile and methyl methacrylate, as well as mixtures thereof, are especially preferred.

Any organic polyisocyanate may be employed in the preparation of the polymer/polyisocyanate dispersions, including multifunctional isocyanates such as diisocyanates, triisocyanates, and polymeric isocyanates. Polyisocyanates that are preferred due to commercial availability include polymethylene polyisocyanates (PAPI), mixtures of 2,4- and 2,6-toluene diisocyanate (TDI), methylene-bis-(4-phenyl isocyanate) (MDI), and the like. Other typical exemplificative isocyanates include, but are not imited to, the following: 3,3'-dimethoxy-4,4'-biphenylene diisocyanate, naphthalene-1,5-diisocyanate, hexamethylene diisocyanate, and mixtures thereof, either in their pure or crude form, the latter form usually containing polymers of the specified isocyanates. The amount of isocyanate employed in the preparation of the polyurethane foams should be sufficient to provide at least one NCO group per active hydrogen (e.g., hydroxyl) group present in the foam-forming composition. An excess of isocyanate compound may be conveniently employed; however, this is generally undesirable due to the high cost of the isocyanate compounds. It is preferable, therefore, to employ no greater than 1.25 NCO groups per active hydrogen in the poly(active hydrogen) compound, and preferably between about 1.0 and about 1.15 NCO groups. The preferred polyisocyanate is TDI.

Catalysts useful in producing the polymer/polyisocyanate compositions of this invention are the free-radical type of vinyl polymerization catalysts such as the peroxides, persulfates, perborates, percarbonates and the azo compounds or any other suitable free-radical catalyst specified in the above-mentioned patents and application. Illustrative of a few such catalysts are 2,2'-azo-bis-isobutyronitrile, 2,2'-azo-bis(2,4-dimethylvaleronitrile), dibenzoyl peroxide, lauroyl peroxide, di-t-butyl peroxide, diisopropyl peroxydicarbonate, t-butyl peroxy-2-ethylhexanoate, t-butylperpivalate, 2,5-dimethylhexane-2,5-di-per-2-ethyl hexoate, t-butylperneodecanoate, t-butylperbenzoate, t-butylpercrotonate, t-butyl perisobutyrate, di-t-butyl perphthalate and the like. Azo-bis-(isobutyronitrile) is the preferred catalyst since it does not impart any objectionable product odor or require special handling in the plant because of possible hazards.

The catalyst concentration is not critical and can be varied within wide limits. As a representative range in forming the polymer/polyisocyanate compositions, the concentration can vary from about 0.1 to 5.0 weight percent, based upon the total feed (polyisocyanate, acrylonitrile, and comonomer) to the reactor. Up to the certain point, increases in the catalyst concentration result in increased monomer conversion but further increases do not substantially increase conversion. On the other hand, increasing catalyst concentration increasingly improves product stability. The catalyst concentration selected will usually be an optimum value considering all factors, including costs.

The temperature range used in producing the polymer/polyisocyanate compositions is not narrowly critical and may vary from about 50° C. or less to about 130° C. or perhaps greater, the preferred range being from 70° C. to 105° C. The catalyst and temperature should be selected so that the catalyst has a reasonable rate of decomposition with respect to the hold-up time in the reactor for a continuous flow reactor or the feed time for a semi-batch reactor.

The preferred process used in producing the polymer/polyisocyanate compositions of this invention involves polymerizing the monomer(s)(e.g., acrylonitrile, with or without one or more comonomer(s)) with the macromolecular monomer in the polyisocyanate while maintaining a low monomer to polyisocyanate ratio throughout the reaction mixture during the polymerization. This provides in the preferred case polymer/polyisocyanate compositions in which essentially all of the polymer particles have diameters of less than 30 microns and generally less than one micron. Such low ratios are achieved by employing process conditions that provide rapid conversion of monomer to polymer. In practice, a low monomer to polyisocyanate ratio is maintained, in the case of semi-batch and continuous operation, by control of the temperature and mixing conditions and, in the case of semi-batch operation, also by slowly adding the monomers to the polyisocyanate. The process can be carried out in various manners such as by a semi-batch reactor, a continuous back-mixed stirred tank reactor, etc. For the latter, a second stage may be used to incrementally increase the conversions of monomers. The mixing conditions employed are those attained using a back-mixed reactor (e.g., a stirred flask or stirred autoclave). Such reactors keep the reaction mixture relatively homogeneous and so prevent localized high monomer to polyisocyanate ratios such as occur in certain tubular reactors (e.g., in the first stages of "Marco" reactors when such reactors are operated conventionally with all the monomer added to the first stage).

When using a semi-batch process, the feed times can be varied (as well as the proportion of polyisocyanate in the reactor at the start versus polyisocyanate fed with the monomer) to effect changes in the product viscosity.

The preferred temperature used in producing the polymer/polyisocyanate dispersions in accordance with this invention is any temperature at which the half life of the catalyst at that temperature is no longer than about 25 percent of the residence time of the reactants and catalyst in the reactor. As an illustration, the half life of the catalyst at a given reaction temperature may be no longer than six minutes (preferably no longer than 1.5 to 2 minutes) when the residence time is 24 minutes or greater. The half lives of the catalysts become shorter as the temperature is raised. By way of illustration, azo-bis-isobuytronitrile has a half life of six minutes at 100° C. and, thus, the residence time should be at least 24 minutes. The maximum temperature used is not narrowly critical but should be lower than the temperature at which significant decomposition of the reactants or discoloration of the product occurs.

In the process used to produce the polymer/polyisocyanate dispersions of this invention, the monomers are polymerized in the polyisocyanate. Usually, the monomers are soluble in the polyisocyanate. When the monomers are not soluble in the polyisocyanates, known techniques (e.g., dissolution of the insoluble monomers in another solvent) may be used to disperse the monomers in the polyisocyanate prior to polymerization. The conversion of the monomers to polymers achieved by this process is remarkably high (e.g., conversion of at least 90 percent to 98 percent of the monomers are generally achieved).

The method of this invention produces polymer/polyisocyanate dispersions which are highly stable even at high non-urethane polymer solids contents of 40 weight percent or higher based on the dispersion, have small polymer particle sizes, are free from troublesome scrap and seeds, have good filterability and are convertible to highly useful polyurethane elastomers, foams, and coatings. The viscosities (25° C.—Brookfield) of the polymer/polyisocyanate composition of this invention are less than 10,000 cps, preferably not greater than 5,000 cps, more preferably not greater than 3,000 cps, and most preferably not greater than 1,000 cps. The polymer/polyisocyanate compositions of this invention are stable dispersions such that essentially all of the polymer particles remain suspended on standing over periods of several months without showing any significant settling.

The final polymer/polyisocyanate compositions of the present invention comprise dispersions in which the polymer particles (the same being either individual particles or agglomerates of individual particles) are relatively small in size and, in the preferred embodiment are essentially less than 10 microns or even as small as one micron or less. This insures that the polymer/polyisocyanate products can be successfully processed in all types of the relatively sophisticated machine systems now in use for large volume production of polyurethane products, including those employing impingement-type mixing which necessitates the use of filters that cannot tolerate any significant amount of relatively large particles.

The polymer concentration of the final polymer/polyisocyanate compositions of this invention can be adjusted by the addition of additional polyisocyanate to provide the polymer concentration suitable for the desired end use. In this manner, the polymer/polyisocyanate compositions can be produced at polymer concentrations of, for example, 40 percent or higher and reduced to polymer concentrations as low as 4 percent or lower by the addition of more polyisocyanate or, alternatively, the composition can be made directly with a polymer concentration of 4 percent by the method of this invention.

The present invention also provides novel polyurethane products made with the novel polymer/polyisocyanate compositions and novel methods for producing such products. The novel polyurethane products are prepared by reacting (a) a polymer/polyisocyanate composition of this invention, (b) a poly(active hydrogen) organic compound, and (c) a catalyst for the reaction of (a) and (b) to produce the polyurethane product, and, when a foam is being prepared, a blowing agent and usually a foam stabilizer. The reaction and foaming operations can be performed in any suitable manner, preferably by the one-shot technique, although the prepolymer technique can be used if desired.

The poly(active hydrogen) organic compounds useful for reaction with the polymer/polyisocyanate compositions to make foams or elastomers include any compatible organic compound containing two or more active hydrogen atoms per molecule. The poly(active hydrogen) compounds are well known to those skilled in polyurethane art and include the polycarboxylic organic acids, polyamino compounds, and polyhydroxy compounds, e.g., polyhydroxy polyesters, organic polyols and the like. Preferably, polyols are used, more preferably the well-known high solids polymer polyols such as those described in U.S. Pat. Nos. 4,454,255 and 4,521,546, both patents being incorporated herein by reference.

Substantially any of the polyols previously used in the art to make polyurethanes can be used and are preferred as the poly(active hydrogen) organic compounds in this invention. Illustrative of the polyols useful in producing polyurethanes in accordance with this invention are the polyhydroxyalkanes, the polyoxyalkylene polyols, or the like. Among the polyols which can be employed are those selected from one or more of the following classes of compositions, alone or in admixture, known to those skilled in polyurethane art:

(a) Alkylene oxide adducts of polyhydroxyalkanes;
(b) Alkylene oxide adducts of non-reducing sugars and sugar derivatives;
(c) Alkylene oxide adducts of phosphorus and polyphosphorus acids;
(d) Alkylene oxide adducts of polyphenols;
(e) The polyols from natural oils such as castor oil and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylethane, 1,1,1,-trimethylolpropane, pentaerythritol, polycaprolactone, xylitol, arabitol, sorbitol, mannitol, and the like. A preferred class of alkylene oxide adducts of polyhydroxyalkanes are the ethylene oxide, propylene oxide, butylene oxide, or mixtures thereof, adducts of trihydroxyalkanes.

A further class of polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, the novolac resins, condensation products of various phenolic compounds, and acrolein; the simplest member of this class being the 1,1,3-tris(hydroxyphenol) propanes, condensation products of various phenolic compounds and glyoxal, glutaraldehyde, and other dialdehydes, the simplest members of this class being the 1,1,2,2-tetrabis(hydroxyphenol) ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid the polymetaphosphoric acids, and the like are desirable for use in this connection.

The polyols employed can have hydroxyl numbers which vary over a wide range. In general, the hydroxyl numbers of the polyols employed in this invention can range from about 20, and lower, to about 1200, and higher. The hydroxyl number is defined as the number of milligrams of potassium hydroxide required for the complete hydrolysis of the fully phthalated derivative prepared from 1 gram of polyols. The hydroxyl number can also be defined by the equation:

$$OH = \frac{56.1 \times 1000 \times f}{m.w.}$$

where
OH = hydroxyl number of the polyol
f = functionality, that is, average number of hydroxyl groups per molecule of polyol
m.w. = molecular weight of the polyol.

The exact polyol employed depends upon the end use of the polyurethane product to be produced. The molecular weight of the hydroxyl number is selected properly to result in flexible or semi-flexible polyurethane foams or elastomers. The polyols preferably possess a hydroxyl number of from about 50 to about 150 for semi-flexible foams, and from about 25 to about 70 for flexible foams. Such limits are not intended to be restrictive, but are merely illustrative of the large number of possible combinations of the above polyol co-reactants.

Polyols useful in making elastomers or foams in this invention include the ethylene oxide and propylene oxide adducts including ethylene glycol, diethylene glycol, the poly(oxyethylene) glycols, the poly(oxypropylene) glycols, triols and higher functionality polyols. Preferred polyols are the poly(oxypropylene-oxyethylene) polyols; especially those having an oxyethylene content of about 20 percent of the total oxyethylene plus oxypropylene (commercially available as POLY-G ®32-48, a product of Olin Corporation). The ethylene oxide when used can be incorporated in any fashion along the polymer chain. Stated another way, the ethylene oxide can be incorporated either in internal blocks, as terminal blocks, or may be randomly distributed along the polymer chain. As is well known in the art, the polyols that are most preferred herein contain varying small amounts of unsaturation. Unsaturation in itself does not affect in any adverse way the formation of the polyurethanes in accordance with the present invention.

The catalysts that are useful in providing polyurethane foams and elastomers in accordance with this invention include: (a) tertiary amines such as bis(dimethylaminoethyl) ether, trimethlamine, triethylamine, N-methylmorpholine, N-ethylmorpholine, N,N-dimethylbenzylamine, N,N,-dimethylethanolamine, N,N',N'-tetramethyl-1,3-butanediamene, triethanolamine, 1,4-diazobicyclo[2.2.2.]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicycladehyde, cyclopentanone-2-carboxylate, acetyl-acetoneimine, bis-acetylacetonealkylenediimines, salicyclaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (f) alcoholates and phenolates of various metals such as Ti(OR)$_4$, Sn(OR)$_4$, Sn(OR)$_2$, Al(OR)$_3$, and the like, wherein R is alkyl or aryl, and the reaction products of alcoholates with carboxylic acids, betadiketones, and 2-(N,N-dialylamino)alkanols, such as the well known chelates of titanium obtained by said or equivalent procedures; (g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

The organotin compounds deserve particular mention as catalysts for catalyzing the polyurethane-forming reactions. These compounds include the dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), and the like. Similarly, there may be used a trialkyltin hydroxide, dialkyltin oxide, dialkyltin dialkoxide, or dialkytin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

The tertiary amines may be used as primary catalysts for accelerating the reactive hydrogen/isocyanate reaction or as secondary catalysts in combination with one or more of the above-noted metal catalysts, e.g., the organotin catalyst. Metal catalysts, or combinations of metal catalysts, may also be employed as the accelerating agents, without the use of amines. The catalysts for catalyzing the polyurethane-forming reaction are employed in small amounts, for example, from about 0.001 percent to about 5 percent, based on the combined weight of the polyisocyanate and the polyol.

As mentioned above, other additives can be used in the manufacture of the polyurethane foams and elastomers of this invention. For example, other fillers, such as calcium carbonate can be added for the purpose of enhancing modulus or reducing cost. The amounts of fillers used can range from 0 to 250 pph (parts per hundred parts) of polymeric materials (e.g., poly(active hydrogen) compound and polymer/polyisocyanate). Additionally, mold release agents, such as zinc stearate, can be used in amounts ranging from 2 to 4 pph based on the combined weights of polymeric materials. Additionally, reinforcing agents, such as glass powder, tiny glass bubbles, and preferably glass fiber 1/32" to ¼" long can be added. The amount of reinforcing agents ranges from 0 to 70 weight percent, preferably about 5 to 70 weight percent, based on the combined weight of the three above-mentioned reactants. Thickeners such as MgO can also be used in amounts ranging from 0 to 2 pph based on the combined weight of the three above-mentioned reactants. Any other additives such as pigments conventionally employed in polyurethane technology can be added in conventional proportions. The pphs and weight percentages given above for the additives are merely representative and amounts of additives outside of these ranges can provide acceptable results.

The distinction between polyurethane foams and elastomers is not sharply defined because all foams and most elastomers contain a gas phase. The foams in general, have densities of less than 10 pounds per cubic foot and elastomers, in general have densities above that value. Microcellular elastomers intended for energy absorbing applications, e.g., as automotive bumpers, generally are made with densities of 10 to 40 pounds per cubic foot whereas microcellular elastomers intended for other applications, e.g. bumper rub strips, bumper guards, side moldings, appliques and the like, where energy absorption is not the prime consideration, generally are made with densities of 40 to 60 pounds per cubic foot. Solid, unfoamed polyurethanes usually have a density of about 72 pounds per cubic foot. The densities of the above-described polyurethanes can be increased by the addition of inert fillers such as glass fibers. Such inert fillers provide improved physical properties such as increased modulus. All of these compositions, i.e., foams, microcellular and solid, filled or unfilled, can be made by the present invention.

When the product being formed is microcellular or solid, an extender can also be added to improve the load-bearing and modulus properties of the composition. Extenders are not normally used in the production of flexible foams, although they can be added, if desired. Suitable extenders include low molecular weight polyols including ethylene glycol, diethylene glycol, 1,4-butanediol and the aromatic glycols, reaction products of alkylene oxides with aromatic amines or alcohols having two active hydrogens. Suitable aromatic glycols are the reaction products of alkylene oxides with amino aryl compounds and dihydroxyaryl compounds, and preferably are the reaction products of ethylene oxide and aniline. Other suitable aromatic glycols include the ethylene oxide and propylene oxide adducts of bisphenol A and the propylene oxide adducts of aniline. Additional suitable extenders are the aromatic amines such as 4,4'-methylene bis(2-chloroaniline) and -phenol-aromatic amine-aldehyde resins which are made by the reaction of phenol-aromatic amine-aldehyde resins which in turn are made by the reaction of a phenol such as phenol or substituted phenols having at least one unsubstituted reactive position on the aromatic nucleus, an aldehyde such as formaldehyde or other aliphatic aldehydes and an aromatic amine such as aniline or other aromatic amines having at least one or two amino hydrogens and no or one nitrogen-bonded alkyl group and at least one unsubstituted position ortho- or para- to the amino group.

When the product being formed is a polyurethane foam product, this may be accomplished by employing a small amount of a blowing agent, such as $CO_2$ produced from water included in the reaction mixture (for example, from about 0.1 to about 5 weight percent of water, based upon total weight of the total reaction mixture, i.e., poly(active hydrogen) compound, polymer/polyisocyanates, catalysts and other additives), or through the use of blowing agents which are vaporized by the exotherm of the reaction, or by a combination of the two methods. Illustrative blowing agents include halogentated hydrocarbons such as trichloromonofluoromethane, dichlorodifluoromethane, dichloromonofluoromethane, dichloromethane, trichloromethane, 1,1-dichloro-1-fluoroethane, 1,1,2-trichloro-1,2,2-trifluoroethane, hexafluorocyclobutane, oxtafluorocyclobutane, and the like. Another class of blowing agents include thermally unstable compounds which liberate gases upon heating, such as N,N'-dimethyl-N,N'-dinitrosoterephthalimide, and the like. The quantity of blowing agent employed will vary with factors such as the density desired in the foamed product.

It is also within the scope of the invention to employ small amounts, e.g., about 0.01 percent to 5.0 percent by weight, based on the total reaction mixture, of a foam stabilizer such as "hydrolyzable" polysiloxanepolyoxyalkylene block copolymer such as the block copolymers described in U.S. Pat. Nos. 2,834,748 and 2,917,480. Another useful class of foam stabilizers are the "nonhydrolyzable" polysiloxanepolyoxyalkylene block copolymers such as the block copoylmers described in U.S. Pat. No. 3,505,377; U.S. patent application Ser. No. 888,067, filed Dec. 24, 1969, now U.S. Pat. No. 3,686,254, and British Patent Specification No. 1,220,471. These various polysiloxane-polyoxyalkylene block copolymers preferably contain from 5 to 50 weight percent of polysiloxane polymer with the remainder being polyoxyalkylene polymer.

Polyurethanes produced according to this invention are useful in the applications in which conventional polyurethanes are employed such as in the manufacture of arm rests, crash pads, mattresses, packaging, automobile bumpers, and carpet underlays.

The following example is intended to illustrate, but in no way limit, the scope of the present invention.

EXAMPLE 1

(A) Preparation of Several Polymer/Polyisocyanate Dispersions Within the Scope of the Present Invention (I) Dispersion of 40 Percent by Weight Solids in Polymer/Polyisocyanate Employing Acrylonitrile as the "Other Monomer"

To a reactor containing a mixture of 1200 grams of TDI and 80 grams of CHEMLINK 4500, which is a polystyryl capped with methacrylate and having a molecular weight of about 13,000, a product of the Sartomer Company, at 70° C., was added at 22.2 grams portion of a mixture of 720 grams of acrylonitrile and 20 grams of VAZO-64 polymerization catalyst (2,2'-azobis-2-methylpropionitrile, a product of E. I. DuPont de Nemours & Co., Inc.). After 90 minutes at 70° C., the rest of the acrylonitrile/VAZO-64 mixture was added to the reactor via feed pump over 3.5 hours while heating the reactor to maintain a reaction temperature between 70° and 88° C. Heating was then stopped and the reaction mixture was stirred overnight. Then, after heating at 70° C. for an additional 2.5 hours, the reaction mixture was vacuum stripped at a temperature of 70° C. and a presence of 8 mm of mercury to provide a polymer/polyisocyanate dispersion having a viscosity of 380 cps at 23° C. The resulting dispersion is identified in TABLE I below as polymer/polyisocyanate B.

(II) Dispersion of 40 Percent by Weight Solids Polymer/Polyisocyanate Employing Acrylonitrile and Vinylidene Chloride as the "Other Monomers"

To a reactor containing a mixture of 240 grams of TDI and 16 grams of CHEMLINK 4500, which is a polystyryl capped with methacrylate and having a molecular weight of about 13,000, a product of the Sartomer Company, at 70° C., was added a 5 gram portion of a mixture of 101 grams of acrylonitrile, 43 grams of vinylidene chloride, and 4 grams of VAZO-52 [2,2'-azobis-(2,4-dimethyl-valero-nitrile), a product of E. I. DuPont de Nemours & Co., Inc.]. After 81 minutes at 70° C., the rest of the monomer/VAZO-52 mixture was added to the reactor via feed pump over three hours while heating the reactor to maintain a reaction temperature between 65° and 85° C. The reaction mixture was then heated for 2.5 hours longer at 70° C., heating was stopped, and stirring was continued over the period of a weekend, after which a dispersion had formed. The resulting dispersion is identified in TABLE I below as polymer/polyisocyanate C.

Polymer/polyisocyanate A as identified in TABLE I below was prepared in an analogous fashion to that given for polymer/polyisocyanate B above except that a decreased amount of acrylonitrile was employed (while maintaining the same ratio of acrylonitrile to CHEMLINK 4500) to provide a 21 weight percent solids content in the dispersion.

Each of the polymer/polyol dispersions given in TABLE I below, namely polymer/polyisocyanate A, B, and C, were "shelf-stable" against phase separation at ambient temperature for in excess of six months.

TABLE II

Formulation for Hand-Mix Foam Made From Polymer Dispersion in TDI

| | Parts by Weight |
|---|---|
| PLURACOL 994LV[1] | 100 |
| Water | 3 |
| DABCO 33LV[2] | 0.2 |
| Q2-5125[3] | 0.8 |
| T-9[4] | 0.1 |
| 40% Polymer Dispersion in TDI | 61.8 |

| | Viscosity | % NCO |
|---|---|---|
| 40% Dispersion of Polyacrylonitrile in TDI | 220–400 cps | 30.3 (theory = 29.0) |

[1]A high solids polymer polyol, a product of BASF Wyandotte, Corporation.
[2]An amine catalyst, a product of Air Products.
[3]A silicon surfactant, a product of Dow Corning.
[4]A tin catalyst, a product of Witco Co.

The resulting mixture was then poured into a cardboard box; and, after the rise was complete, the foam was cured in a 100° C. oven for about 15 minutes. After cooling to room temperature, various physical properties for each foam were measured, including the weight percent of non-urethane polymer solids based upon the

TABLE I

FORMULATIONS AND PHYSICAL PROPERTIES OF POLYURETHANE FOAMS FABRICATED BY REACTING VARIOUS POLYMER/POLYISOCYANATES OF THE PRESENT INVENTION WITH A COMMERCIAL POLYMER/POLYOL

| Foam | "A-Side" % Solids | "B-Side" % Solids | % Solids | Density,pcf[1] | Compression Strength at 25% Compression, psi[2] |
|---|---|---|---|---|---|
| Comparison Foam A | TDI (No solids) | PLURACOL 994LV[3] polymer/polyol (40% solids) | 30 | 2.46 | 1.10 |
| Comparison Foam B | TDI (No solids) | PLURACOL 994LV[3] polymer/polyol (40% solids) | 30 | 1.98 | 1.03 |
| Foam 1 | Polymer/Polyisocyanate A (21 wt. % solids) | PLURACOL 994LV[3] polymer/polyol (40% solids) | 33 | 2.39 | 1.14 |
| Foam 2 | Polymer/Polyisocyanate B (40 wt. % solids) | PLURACOL 994LV[3] polymer/polyol (40% solids) | 40 | 2.46 | 1.18 |
| Foam 3 | Polymer Polyisocyanate C (40 wt. % solids) | PLURACOL 994LV[3] polymer/polyol (40% solids) | 40 | 2.10 | 1.09 |

[1]Density pcf was measured in accordance with ASTM D-1622-63.
[2]Compression strength at 25 percent compression was measured on a Chatillon gauge on 2 inch × 2 inch × 1 inch samples. This Chatillon gauge is manufactured by John Chatillon & Sons, Inc., New York, New York.
[3]A polymer/polyol product of BASF Wyandotte Corporation.

(B) Preparation of Polyurethane Foam by Reacting Polymer/Polyisocyanates or Polyisocyanates With a Commercial Polymer/Polyol A "B-side" mixture consisting of a polymer polyol (PLURACOL 994LV, a product of BASF Wyandotte, Corp.), an amine catalyst (DABCO 33LV, a product of Air Products), a silicone surfactant (Q2-5125, a product of Dow Corning), and water was mixed for about 20 seconds. Stannous octoate (T-9, a product of Witco Co.) was added and mixing was continued for another five seconds, after which time an "A-side" consisting of TDI or a polymer/polyisocyanate dispersion in TDI was added as identified in TABLE I above, followed by mixing for an additional 7 to 10 seconds. The specific formulation for the combined "A-side" and "B-side" plus catalyst for FOAMS 2 and 3 identified in TABLE I above was as follows:

total weight of the foam, density, and compression strength measurements. The results are given in TABLE I above.

As indicated in TABLE I, when the lower polymer solids level in the foam available by the use of polymer polyol and TDI (30 percent solids in the foam, see Comparison Foams A and B in TABLE I) is increased to 33 percent and 40 percent solids in the foam by the use of polymer dispersion in TDI, the compression strength of the foam, a measurement of load-bearing capacity of the foam, as determined by compression strength at 25 percent compression, is proportionally increased (see FOAMS 1, 2, and 3 in TABLE I). For example, while FOAMS A, 1, and 2, all have essentially the same density, as the percent solids in the foam is increased from 30 percent to 40 percent, the 25 percent compression is increased from 1.10 psi to 1.18 psi. In addition, when foam density is lowered by the use of increased water, the increased solids level in the foam can maintain load-bearing. This is shown by comparing Comparison Foam B, which has 30 percent solids, a density of 1.98 pcf, and a 25 percent compression of 1.03 psi, with FOAM 3, which has 40 percent solids, a density of 2.10 pcf, and a 25 percent compression of 1.09 psi. Thus, while Comparison Foam B and FOAM 3 have comparable densities, the increased solids level in FOAM 3 provides significantly greater load-bearing strength.

In addition, the data presented in TABLE I shows that the ratio of $$\frac{\Delta \text{Compression strength}}{\Delta \text{Density}}$$

is about 0.25 when comparing FOAM 2 with FOAM 3 whereas this ratio is only about 0.15 when comparing Comparison Foam A and Comparison Foam B. As an illustration, $$\frac{2.46 - 2.10}{1.18 - 1.09} = 0.25$$

in the FOAM 2 versus FOAM 3 comparison of ratio of $\Delta$ compression strength to $\Delta$ density.

What is claimed is:

1. A stable polymer/polyisocyanate dispersion comprising:
   (a) a polyisocyanate and
   (b) a polymer which is a reaction product of an ethylenically unsaturated macromol-ecular monomer and at least one other ethylenically unsaturated monomer.

2. The polymer/polyisocyanate dispersion of claim 1 wherein said other ethylenically unsaturated 1 monomer is selected from the group consisting of vinylidene chloride, acrylonitrile, mixtures of acrylonitrile and methyl methacrylate, and mixtures 3. The polymer/polyisocyanate dispersion of claim 1 wherein said macromolecular monomer is represented by the empirical formula:

A—X wherein A is an oligomer soluble in said polyisocyanate and X is an ethylenically unsaturated group.

4. The polymer/polyisocyanate dispersion of claim 1 wherein said polymer contains between about 0.25 and about 20 weight percent of said ethylenically unsaturated macromolecular monomer based upon the weight of said ethylenically unsaturated macromolecular monomer plus said other ethylenically unsaturated monomer in said polymer.

5. A stable polymer/polyisocyanate dispersion comprising an in situ polymerization product of an ethylenically unsaturated macromolecular monomer and at least one other ethylenically unsaturated monomer in the presence of a polymerization catalyst, said in situ polymerization being carried out in a polyisocyanate.

6. The dispersion of claim 5 wherein said other ethylenically unsaturated monomer is selected from the group consisting of vinylidene chloride, acrylonitrile, mixtures of acrylonitrile and methyl methacrylate, and mixtures thereof.

7. The dispersion of claim 5 wherein said macromolecular monomer is represented by the empirical formula:

A—X wherein A is an oligomer soluble in said polyisocyanate and X is an ethylenically unsaturated group.

8. The dispersion of claim 5 wherein said polymer contains between about 0.25 and about 20 weight percent of said ethylenically unsaturated macromolecular monomer based upon the weight of said ethylenically unsaturated macromolecular monomer plus said other ethylenically unsaturated monomer in said 9. A method for producing a stable polymer/polyisocyanate dispersion comprising the steps
   (a) polymerizing an ethylenically unsaturated macromolecular monomer with at least one other ethylenically unsaturated monomer to produce a polymer, and
   (b) mixing said polymer with at least one polyisocyanate to produce said dispersion.

10. The method of claim 9 wherein said other ethylenically unsaturated monomer is selected from the group consisting of vinylidene chloride, acrylonitrile, mixtures of acrylonitrile and methyl methacrylate, and mixtures thereof.

11. The method of claim 9 wherein said macromolecular monomer is represented by the empirical formula:

A—X wherein A is an oligomer soluble in said polyisocyanate and X is an ethylenically unsaturated group.

12. The method of claim 9 wherein said polymer contains between about 0.25 and about 20 weight percent of said ethylenically unsaturated macromolecular monomer based upon the weight of said ethylenically unsaturated macromolecular monomer plus said other ethylenically unsaturated monomer in said polymer.

13. A polyurethane foam fabricated by reacting a polymer/polyisocyanate dispersion with a poly(active hydrogen) compound in the presence of a blowing agent and a polyurethane reaction catalyst wherein said polymer/polyisocyanate dispersion comprises a polymer in a polyisocyanate, wherein said polymer is a reaction product of an ethylenically unsaturated macromolecular monomer and at least one other ethylenically unsaturated monomer.

14. The polyurethane foam of claim 13 which additionally has a non-urethane polymer solids content of at least about 40 weight percent based upon the total weight of the foam.

15. The polyurethane foam of claim 13 having a ratio of $\Delta$ compression strength at 25 percent compression to $\Delta$ density of at least about 0.2.

16. The polyurethane foam of claim 13 wherein said poly(active hydrogen) compound is a polyol, a polymer/polyol, or a mixture thereof.

17. The polyurethane foam of claim 13 wherein said other ethylenically unsaturated monomer is selected from the group consisting of vinylidene chloride, acrylonitrile, mixtures of acrylonitrile and methyl methacrylate, and mixtures thereof.

18. The polyurethane foam of claim 13 wherein said macromolecular monomer is represented by the empirical formula:

A—X wherein A is an oligomer soluble in said polyisocyanate and X is an ethylenically unsaturated group.

19. The polyurethane foam of claim 13 wherein said polymer contains between about 0.25 and about 20 weight percent of said ethylenically unsaturated macromolecular monomer based upon the weight of said ethylenically unsaturated macromolecular monomer plus said other ethylenically unsaturated monomer in said polymer.

20. A polyurethane elastomer, adhesive, sealant, or coating fabricated by reacting a polymer/polyisocyanate dispersion with a poly(active hydrogen) compound in the presence of a polyurethane reaction catalyst wherein said polymer/polyisocyanate dispersion comprises a polymer in a polyisocyanate, wherein said polymer is a reaction product of an ethylenically unsaturated macromolecular monomer and at least one other ethylenically unsaturated monomer.

21. The polyurethane elastomer, adhesive, sealant, or coating of claim 20 wherein said poly(active hydrogen) compound is a polyol, a polymer/polyol, or a mixture thereof.

22. The polyurethane elastomer, adhesive, sealant, or coating of claim 20 wherein said other ethylenically unsaturated monomer is selected from the group consisting of vinylidene chloride, acrylonitrile, and mixtures of acrylonitrile and methyl methacrylate.

23. The polyurethane elastomer, adhesive, sealant, or coating of claim 20 wherein said macromolecular monomer is represented by the empirical formula:

A—X wherein A is an 1 soluble in said polyisocyanate and X is an ethylenically unsaturated group.

24. The polyurethane elastomer, adhesive, sealant, or coating of claim 20 wherein said polymer contains between about 0.25 and about 20 weight percent of said ethylenically unsaturated macromolecular monomer based upon the weight of said ethylenically unsaturated macromolecular monomer plus said other ethylenically unsaturated monomer in said polymer.

* * * * *

UNITED STATES PATENT AND TRADEMARK OFFICE
CERTIFICATE OF CORRECTION

PATENT NO. : 4,695,596

DATED : September 22, 1987

INVENTOR(S) : Phillip T. Berkowitz

It is certified that error appears in the above-identified patent and that said Letters Patent is hereby corrected as shown below:

In column 2, line 57, after "unsaturated" (first occurrence) should read --macromolecular monomer and at least one other ethylenically unsaturated monomer--.

In column 2, line 57, delete "ethylenically unsaturated monomer".

In column 3, line 19, after "of" delete "L".

In column 5, line 21, after "not" delete "imited" and insert --limited--.

In claim 1, section b, line 2, delete "macromol-ecular" and insert --macromolecular--.

In claim 2, line 5, after "mixtures" insert --thereof.--.

In claim 8, line 6, after "said" insert --polymer.--.

In claim 23, line 5, delete "1" and insert --oligomer--.

Signed and Sealed this

Twenty-ninth Day of March, 1988

Attest:

DONALD J. QUIGG

*Attesting Officer*  *Commissioner of Patents and Trademarks*